Sept. 27, 1927.

W. F. CLARK 1,643,575

HEAT CONTROLLING DEVICE

Filed July 14, 1921

*INVENTOR.*
Warren F. Clark
BY
*ATTORNEY*

Patented Sept. 27, 1927.

1,643,575

UNITED STATES PATENT OFFICE.

WARREN FRANKLIN CLARK, OF CLEVELAND, OHIO.

HEAT-CONTROLLING DEVICE.

Application filed July 14, 1921. Serial No. 484,802.

This invention relates to heat controlling devices of the type employed to make or break an electric current upon predetermined temperature variations. The objects of the invention are the provision of a new and improved construction of bimetallic thermostat in which the opening and closing of the circuit shall be quick, clean, and without chattering; the provision of a thermostat which shall be capable of breaking a larger current and which is also susceptible of more accurate adjustment than previous devices; the provision of a new and improved support for such thermostat; the provision of a new and simplified arrangement for adjusting such thermostat; the provision of a new and improved thermostatic cell; the provision of a new and improved liquid heating mechanism combining rapid heating with economy of current consumption, while further objects and advantages of the invention will become apparent as the description proceeds.

Figure 1:
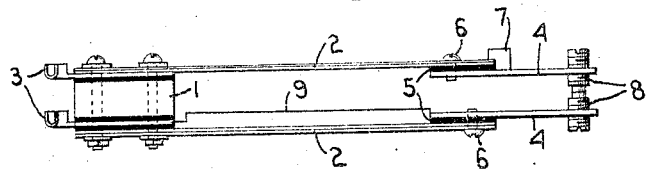
Figure 2:
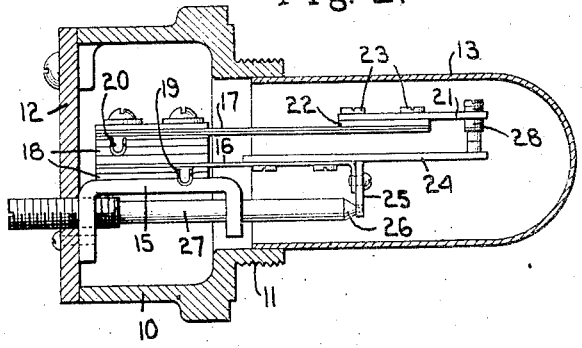
Figure 3:
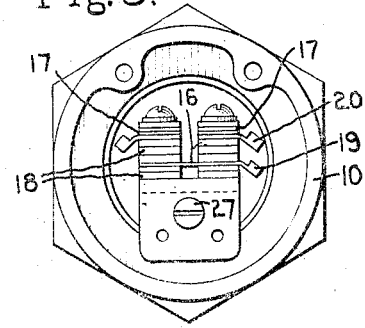
Figure 4:
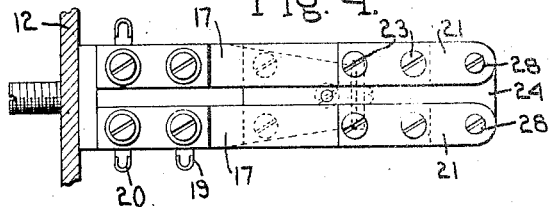
Figure 6:
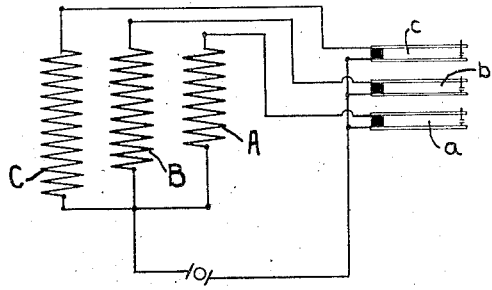
Figure 5:
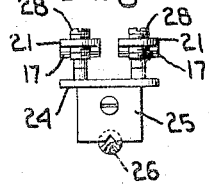
Figure 7:
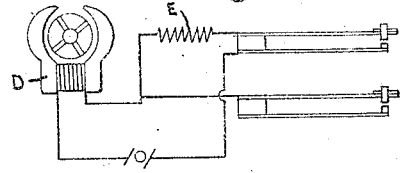

In the drawings accompanying and forming a part of this application Fig. 1 is a side elevation of a simple type of thermostat embodying certain improvements; Fig. 2 is a longitudinal sectional view of my improved thermostatic cell; Fig. 3 is a left-hand elevation of the device shown in Fig. 2, the cover plate being omitted; Fig. 4 is a top plan view, and Fig. 5 is a right-hand elevation of the thermostatic members shown in Fig. 2; Fig. 6 is a wiring diagram of a liquid heating apparatus embodying my improvements; and Fig. 7 is a diagrammatic view showing my improvements as applied to a motor control.

Describing by reference characters the parts shown in this drawing, 1 represents a block of insulating material and 2—2 represent compound bars made of plies of metal of unequal thermal expansion. In Fig. 1 two such bars are employed, secured to the opposite sides of the block 1 and having the metals of maximum expansion arranged up on their adjacent sides. Suitable electric terminals 3—3 are provided at the bases of these members, while comparatively massive metal members 4—4 are secured to their free ends, pads 5 of heat insulating material being interposed between these members and the bars themselves, and the fastening means 6 being so chosen and arranged as to connect the parts electrically with a minimum of thermal connection. This can be effected by the use of rivets or screws 6—6 so insulated both thermally and electrically, employing a separate attenuated conducting element 7 which shall conduct the current readily but not the heat; or one of the rivets can be made of an attenuated size sufficient to carry the current without conveying any material quantity of heat from one part to the other as shown in Fig. 2; or the electric current can be carried by a separate conductor wholly apart from the bar as shown at 9 in Fig. 1.

To the free ends of the members 4—4 are attached the contact members 8, of which one at least is generally adjustable. One of the drawbacks of previous thermostatic contacts has been that at the instant of closing the circuit the local heating produced at the contact points would cause them to diverge, breaking the circuit for local reasons despite the fact that the surrounding conditions indicated a temperature which should warrant them to remain closed. This opening and closing by reason of local heating would generally occur several times until the external cooling had reached such a point that local heating would be unable to overcome its effect. This action is entirely overcome by insulating the blocks 4—4 thermally and the operation is further improved by making these blocks of considerable heat capacity.

Referring now to a specimen apparatus employing these improvements as shown in Figs. 2 to 5 inclusive, 10 represents a hollow casing having at one end a threaded neck 11 adapted to be screwed into the side of the heating tank or like device and having opposite said neck a removable cover 12. Hermetically mounted in the neck is a hollow thin walled shell 13 and carried by the cover is a thermostat device projecting into this shell. 15 represents a U-shaped bracket having one of its legs secured to the cover and having rigidly attached to its base a thermostatic unit comprising a flexible conductor 16 and a bi-metallic bar 17 insulated from each other and from the base by suitable pads 18 and having independent wire terminals 19 and 20. Secured to the free end of the bar 17 is the metal member 21, preferably of rather considerable heat capacity and thermally insulated from the bar by the padding 22 and secured in place by screws 23 in such wise as to be thermally insulated and electrically connected. Rigidly secured to the end of the member 16 is a metal bar 24 having a lateral branch 25 which contacts with the conical head 26 of the adjusting screw 27 which projects through the two arms of the U 15. The free ends of the members 21 and 24 carry the contacts 28 one at least of which is adjustable.

In the present embodiment two similar bars 17—17 are arranged side by side and the member 24 is made of suitable width for co-operation therewith, only a single screw 27 being employed which flexes the member 16 so as to bring the contact points into engagement at a higher or lower temperature as may be desired. The end contacts are, however, adjusted so as to come into engagement at different temperatures, this being for the double reason of preventing such a sudden make and break of current as to burn out the fuses and also to enable rapid heating combined with economy of current consumption. The different thermostat members are connected in circuit with different heating coils, these being preferably of unequal current capacity and arranged so that the coil or coils of greater current consumption is or are disconnected in advance of the coil or coils of smaller current consumption. In Fig. 6 I have illustrated three such heating coils connected to a themostat of three contacts arranged to come into action sucessively. Coil A has the highest heating effect and is connected to thermostat $a$ which is adjusted to open at the lowest temperature; coil B has a lower heating effect and is connected to thermostat $b$ which is arranged to open at an intermediate temperature; coil C has the smallest heating effect and is connected to the thermostat $c$ which opens only at the highest temperature desired to be maintained by the apparatus. All these coils are non-inductively wound. At starting all the coils co-operate to heat the liquid rapidly until its temperature is raised approximately to the desired point whereupon coil A is disconnected without sparking (owing to the combined effect of the massive insulated block carried by the thermostat $a$ and to the fact that the other coils constitute a shunt). This is repeated by the thermostat $b$ leaving coil C to maintain the liquid temperature and itself to be disconnected in its turn, sparking being prevented both by the thermal insulation of its terminals and by the smallness of the current which it carries.

In the case of a load which cannot be broken into sections, and particularly in the case of an inductive load such as the motor D shown in Fig. 7, I employ two (or more) thermostats in parallel, arranged to open and close one after the other, employing in circuit with that which is last to open a non-inductive resistance F adapted to choke the current to so small an amount as to limit the arcing to a sufficiently small value to permit its heat effect to be absorbed by the insulated block, or to be prevented by the use of a very small and inexpensive condenser. When a cell is used as shown in Fig. 2 it is preferably filled with oil, thus gaining the double advantage of close thermal contact between the thermostat and its surroundings and of quenching any arc.

By the expedients herein described I am able to produce a thermostatic control device which will open and close a current of considerable magnitude, without the employment of relays or other expensive and complicated apparatus. I employ these devices for water heaters, coffee urns, glue pots, candy kettles, steam-tables, vulcanizers, rubber molds, and any other places where an accurate temperature control is required. I do not restrict myself to the use of this thermostat with an electrically operated heating device since it can equally well be used with a fuel heated mechanism, the electric current being employed to regulate drafts, or fuel valves as may be desired.

I do not limit myself to any details of structure or arrangement herein shown except as the same are recited in the claims hereto annexed.

Having thus described my invention what I claim is:

1. In a thermostat, the combination with a support of a heat responsive bar and a flexible member projecting in the same direction therefrom, said bar and member having co-operating electric contacts and said member having a lateral extension, and a screw carried by said support parallel to said bar and member and movable longitudinally of said member and engaging said extension whereby the device is adjusted.

2. In a thermostat, the combination, with a support of a heat responsive bar and a flexible member projecting side by side therefrom in the same direction, cooperating electric contacts carried by said bar and member, an adjusting screw carried by said support lengthwise of said bar and member, and operative connections between said screw and member whereby said member can be flexed.

3. In a thermostat, the combination with a support of a plurality of heat responsive bars projecting therefrom and also a flexible member, an electric contact carried by each bar, a pair of electric contacts carried by said member and cooperating therewith, an adjusting screw carried by said support lengthwise of said bar and member, and operative connections between said screw and member whereby said member can be flexed.

4. In a device of the character described, in combination, a hollow casing having an exteriorly screw threaded nipple, a thin walled metal shell mounted inside said nipand projecting beyond the end of the same, a support carried by said casing, a bimetallic heat responsive element having one end secured to said support and the other end projecting into said shell, an elongated flexible member secured at one end to said support, the other end thereof projecting into said shell side by side with said bimetallic element, cooperating electric contact members carried by the free ends of said element and member, an adjusting screw threaded into said support and operable from outside the same, and said screw and member having cooperating camming parts whereby said member may be moved toward and from said element.

In testimony whereof, I hereunto affix my signature.

WARREN FRANKLIN CLARK.